US010809770B2

(12) United States Patent
Huang

(10) Patent No.: US 10,809,770 B2
(45) Date of Patent: Oct. 20, 2020

(54) DEVICE FEET WITH A MOVABLE SUPPORT

(71) Applicant: HEWLETT-PACKARD DEVELOPMENT COMPANY, L.P., Spring, TX (US)

(72) Inventor: Chin-Hung Huang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/335,842

(22) PCT Filed: Nov. 11, 2016

(86) PCT No.: PCT/US2016/061674
§ 371 (c)(1),
(2) Date: Mar. 22, 2019

(87) PCT Pub. No.: WO2018/089018
PCT Pub. Date: May 17, 2018

(65) Prior Publication Data
US 2020/0026324 A1    Jan. 23, 2020

(51) Int. Cl.
*G06F 1/16* (2006.01)
*F16M 13/00* (2006.01)

(52) U.S. Cl.
CPC .......... *G06F 1/166* (2013.01); *F16M 13/005* (2013.01); *G06F 1/1618* (2013.01); *F16M 2200/028* (2013.01)

(58) Field of Classification Search
CPC ..... G06F 1/166; G06F 1/1618; H05K 5/0234; F16M 13/005; F16M 2200/08
See application file for complete search history.

(56) References Cited

U.S. PATENT DOCUMENTS

| 6,366,440 | B1 | 4/2002 | Kung | |
|---|---|---|---|---|
| 6,903,927 | B2 | 6/2005 | Anlauff | |
| 8,467,178 | B2 | 6/2013 | Probst et al. | |
| 8,705,229 | B2 | 4/2014 | Ashcraft et al. | |
| 9,423,828 | B2 | 8/2016 | Sprenger et al. | |
| 2010/0315773 | A1* | 12/2010 | Senatori ............... | H05K 5/0234 361/679.55 |
| 2013/0016460 | A1* | 1/2013 | Yeh ....................... | G06F 1/1675 361/679.01 |
| 2013/0222995 | A1* | 8/2013 | Wang .................... | G06F 1/1613 361/679.12 |
| 2015/0146373 | A1 | 5/2015 | Deng et al. | |

FOREIGN PATENT DOCUMENTS

WO    10-2007-0002485 A    1/2007
WO    WO-2015149276 A1    10/2015

* cited by examiner

*Primary Examiner* — James Wu
(74) *Attorney, Agent, or Firm* — HP Inc. Patent Department

(57) ABSTRACT

In an example, a device foot may include a support movable between a first position and a second position, and a bias member to urge the support towards the first position. An example device foot may further include a latch biased towards a locked position, and movable between the locked position and a released position. Further, the latch may lock the support in the first position if the latch is disposed in the locked position, and may release the support if the latch is disposed in the released position such that the support is movable from the first position to the second position. An example device foot may further include a magnetic element fixed to the latch.

14 Claims, 3 Drawing Sheets

DEVICE FEET WITH A MOVABLE SUPPORT

BACKGROUND

Devices such as electronic devices may include supports or feet upon which the device may rest upon a surface. Such supports or feet may enable a device to rest upon a surface in a given orientation. Further, devices may be used or utilized in more than one orientation or configuration, wherein the device may have separate sets of supports or feet to support the device in each orientation.

DETAILED DESCRIPTION

Devices such as electronic devices may include feet upon which the device may rest. Such feet may support an electronic device as it is positioned upon a surface, such as a table, desk, or another surface, and/or may protect a surface or body of the electronic device from scratches or scraping resulting from the electronic device being set upon such a surface. Additionally, electronic devices may have the capability to be used in more than one orientation or configuration. As such, feet of electronic devices may not be able to support the electronic devices in such other orientations. Therefore, feet may enable an electronic device to rest upon a surface in a first orientation, but may not be able to support the electronic device in a secondary or other orientation.

In some situations, it may be desirable to support an electronic device with a device foot or feet in more than one orientation in order to protect the electronic device as it is used in different ways. As such, some electronic devices may include more than one set of fixed feet in order to support and protect the electronic device as it is used in various orientations and configurations. Such multiple sets of fixed feet may protrude from surfaces of the electronic device, for example, a top surface or keyboard deck, such that the fixed feet may protect the electronic device when being used in an orientation wherein such a surface is resting upon a table or desk. As such, in some situations, multiple sets of fixed feet for a single device may have a negative aesthetic appearance, and/or may make the electronic device uncomfortable for a user to use in some or all of the possible orientations of the electronic device.

Implementations of the present disclosure provide a device foot with a movable support. Examples of device feet described herein may support and/or protect an electronic device as it is used in more than one orientation. Further, examples of device feet described herein may only protrude from one surface of the electronic device at a time, for example, the surface upon which the electronic device may be resting. As such, examples of device feet described herein may improve the aesthetic appearance of the electronic device, and may make the electronic device more comfortable to use over similar devices that have multiple sets of fixed feet.

Figure 1A:
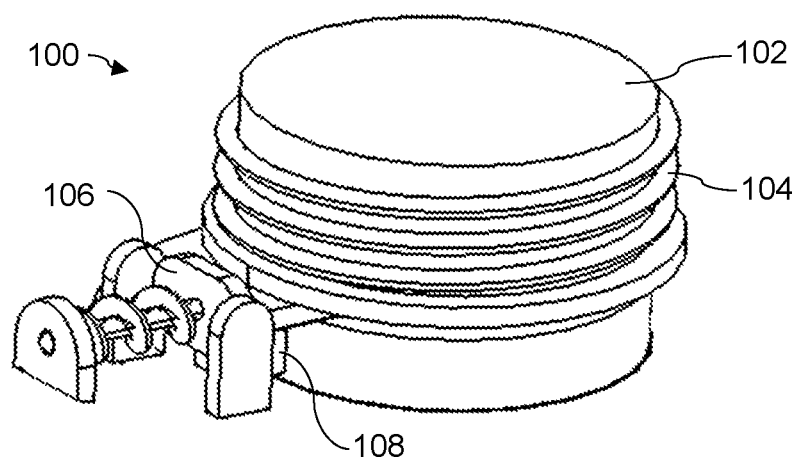
FIG. 1A is a perspective view of an example device foot.
Figure 1B:
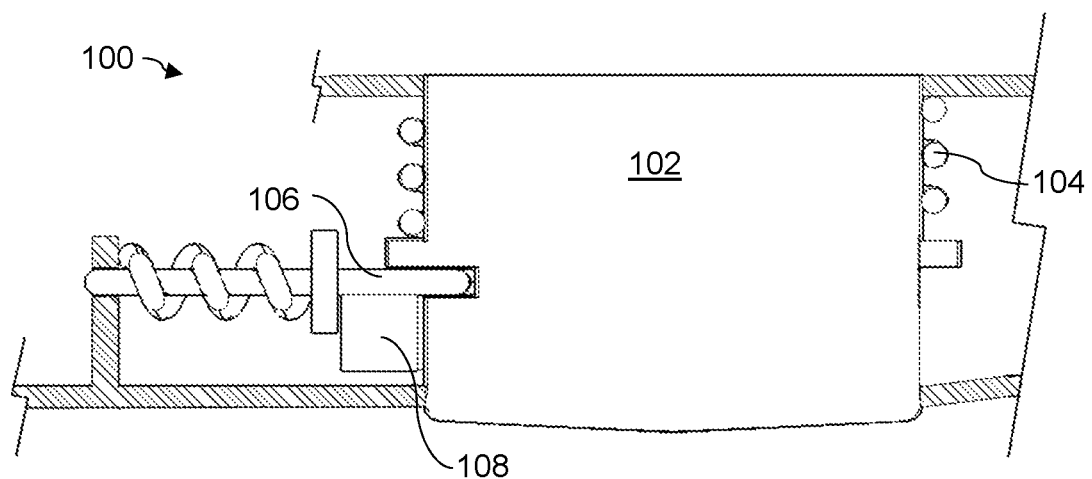
FIG. 1B is a cross-sectional view of an example device foot.

Referring now to FIG. 1A, a perspective view of an example device foot 100 is illustrated. Referring additionally to FIG. 1B, a cross-sectional view of example device foot 100 is illustrated. Example device foot 100 may include a support 102 movable between a first position and a second position, and a bias member 104 to urge the support 102 towards the first position. Example device foot 100 may further include a latch 106 biased towards a locked position, and movable between the locked position and a released position. In some implementations, the latch 106 may lock the support 102 in the first position if the latch 106 is disposed in the locked position, and may release the support 102 if the latch 106 is disposed in the released position such that the support is movable from the first position to the second position. Example device foot 100 may further include a magnetic element 108 fixed to the latch.

Figure 2A:
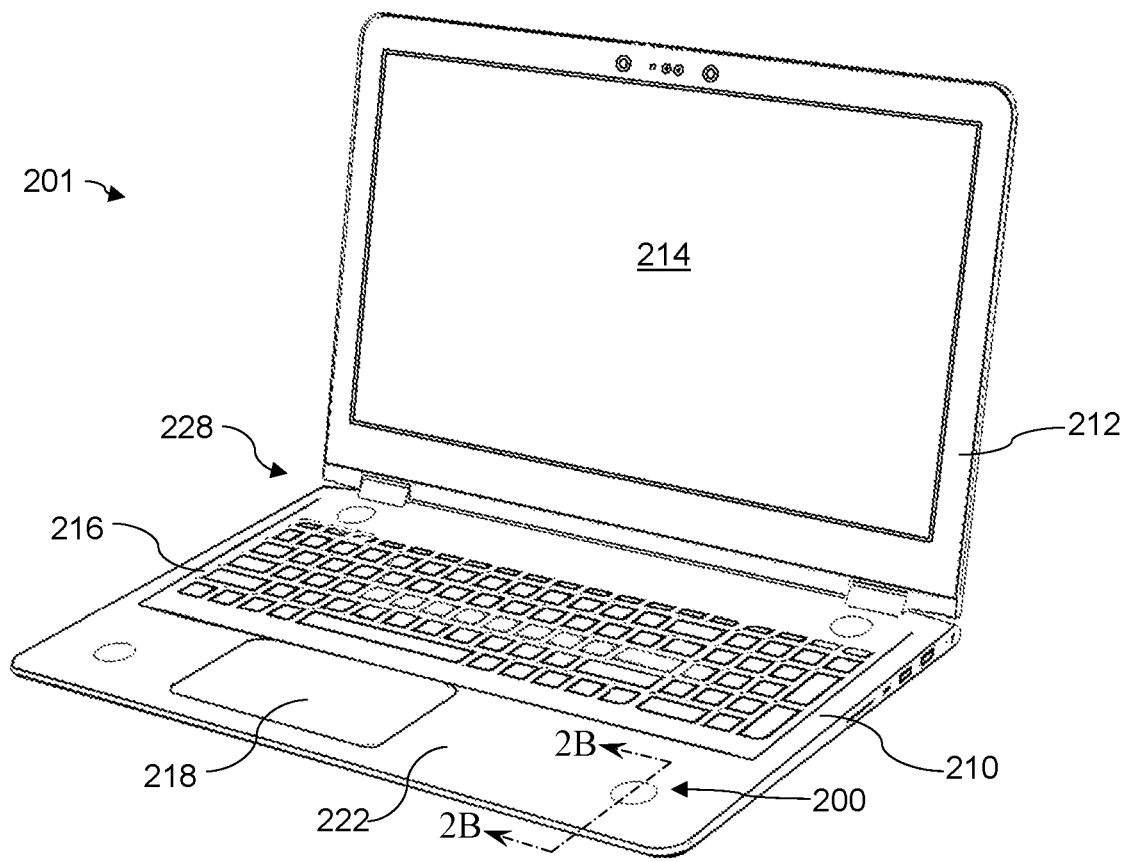
FIG. 2A is a perspective view of an example electronic device having an example device foot.

Referring now to FIG. 2A, an example electronic device 201 is illustrated, wherein the electronic device 201 includes an example device foot 200. Example device foot 200 may be similar to example device foot 100. Further, the similarly named elements of example device foot 200 may be similar in function and/or structure to the elements of example device foot 100, as they are described above. In some implementations, the electronic device 201 may include a single device foot 200, or, in other implementations, the electronic device 201 may include more than one device foot 200. In yet further implementations, the electronic device may include feet of other types, in addition to an example device foot 200. In some implementations, the electronic device 201 may be a computing device, and may include components such as processors, storage drives, memory, power supplies, and/or other components suitable for use in a computing device. In further implementations, the electronic device 201 may be a notebook computer. In yet further implementations, the electronic device 201 may be a convertible notebook computer, wherein the convertible notebook computer may be used in a traditional clamshell orientation, or the display may be flipped around to the backside of the convertible notebook computer and may be used like a touch-screen tablet.

In some implementations, the electronic device 201 may include a device housing 228. The device housing 228 may include a base housing 210, and a display housing 212 hingeably engaged with the base housing 210. The base housing 210, in some implementations, may include a user input interface. In further implementations, the base housing 210 may include a keyboard 216, and/or a track pad 218. In yet further implementations, the base housing 210 may resemble a base of a notebook computer, and/or may contain computing device components within the base housing 210.

The display housing 212 may be hingeably engaged with the base housing 210 such that the display housing 212 is movable between an open position, as illustrated in FIG. 2A, and a folded position. In some implementations, when disposed in the open position, the display housing 212, along with the base housing 210, may resemble a notebook computer. In some implementations, the display housing 212 may include a display 214 having a graphical user interface (GUI) or other graphics. In further implementations, the display 214 may be a touchscreen display.

Figure 2B:
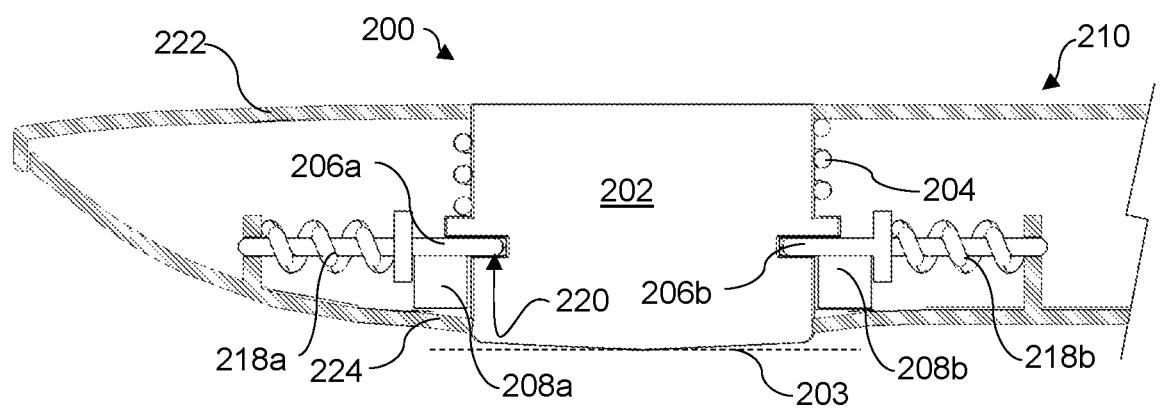
FIG. 2B is a cross-sectional view of an example electronic device having an example device foot.

The electronic device 201 may include an example device foot 200 disposed within the device housing 228. In some implementations, the example device foot 200 may be disposed within the base housing 210 of the device housing 228. In further implementations, the example device foot 200 may be disposed in another portion of the device housing 228, or in another portion of the electronic device 201. Referring additionally to FIG. 2B, a cross-sectional view of an example device foot 200 is illustrated, wherein the view is taken along view line 2B-2B of FIG. 2A. The example device foot 200 may include a support 202, a bias member 204, a latch 206a, and a magnetic element 208a fixed to the latch 206a. In some implementations, the example device foot 200 may further include a second latch 208b, and a second magnetic element 208b fixed to the second latch 206b. In implementations having a second latch and a second magnetic element, the latch 206a and magnetic element 208a may be referred to as a first latch 206a, and a first magnetic element 208a.

The support 202 may be a component through which the electronic device 201 may rest upon a surface, such as a table, desk, a user's lap, or another suitable surface. Further, the support 202 may protect a surface or outer skin of the electronic device 201 through which the support 202 protrudes, by keeping such a surface or outer skin spaced away from the surface upon which the electronic device 201 is resting. By keeping the outer skin or surface of the electronic device 201 spaced away from the surface upon which the electronic device 201 is disposed, the support 202 may prevent scratches, mars, scrapes, or other damage from occurring to the outer skin of the electronic device 201. Further, the support 202 may prevent the electronic device 201 from slipping or sliding on the surface upon which the electronic device 201 is disposed. In some implementations, the support 202 may include a tactile or sticky material, or a material having a high coefficient of friction, such as rubber, plastic, or another polymer, and in other implementations, the support 202 may include other materials. In further implementations, the support may include, or may be referred to as a bumper, foot, or pad.

The support 202 may be movable between a first position, as illustrated in FIG. 2B, and a second position. In some implementations, the support 202 may protrude from a first side 224 of the electronic device 201 when the support 202 is disposed in the first position. The support 202 may protrude from the first side 224 such that the support 202 creates a gap or space between the first side 224 and a surface upon which the electronic device 201 is sitting, resting, or is otherwise disposed. Such a surface may be represented in FIG. 2B by reference line 203. In some implementations, the first side 224 may be a first side of the device housing 228, or, further, the base housing 210. In some implementations, the first side 224 may be an exterior, outside, or bottom side or surface of the base housing 210. When disposed in the first position, as illustrated in FIG. 2B, the support may be flush, below flush, or otherwise may not protrude from a second side 222 of the electronic device 201. In some implementations, the second side 222 may be a second side of the device housing 228, or, further, the base housing 210. In some implementations, the second side 222 may be an exterior, or top side or top surface of the base housing 210, and, in some implementations, may be referred to as a deck, keyboard deck, or a user interface surface.

The bias member 204 may be a resilient component that is elastically deformable. In other words, the bias member 204 may be capable of returning to its original shape after undergoing a deformation. In some implementations, the bias member 204 may exert a reactive force in response to being deformed, with such a reactive force being proportional to the degree of deformation. In some implementations, the bias member 204 may be a spring or a compression spring. In other implementations, the bias member 204 may be another type of spring, such as an extension spring, a torsion spring, or a leaf spring. The bias member 204 may be disposed and engaged with the support 202 such that the bias member 204 may urge or force the support 202 towards the first position. In further implementations, the bias member 204 may be disposed within the base housing 210, and may be engaged with the support 202 such that the bias member 204 is squeezed, compressed, or otherwise deformed in between the support 202 and an interior surface of the second side 222. Thus, the bias member 204 may exert a reactive force against the support 202 in the direction of the first position, and/or away from the second side 222 and towards the first side 224.

The latch or first latch 206a may be a rigid or semi-rigid member and may be movable between a locked position, shown in FIG. 2B, and a released position. The locked position and the released position may sometimes be referred to as a first locked position and a first released position. The first latch 206a may lock, retain, or otherwise hold the support 202 in the first position when the first latch 206a is disposed in the first locked position. In some implementations, the first latch 206a may be biased towards the first locked position. In further implementations, the first latch 206a may engage with a retention pocket 220 of or on the support 202 when the first latch 206a is disposed in the first locked position. The retention pocket 220 may be a slot, cutout, ledge, or other aperture or suitable geometry that may receive the first latch 206a, or a portion thereof, when the first latch 206a is disposed in the first locked position such that the engagement between the retention pocket 220 and the first latch 206a may lock or retain the support 202 in the first position. In some implementations, the first latch 206a may have a post, tab, key, or other suitable geometry to engage with the retention pocket 220 when disposed in the first locked position.

In some implementations, the example device foot 200 may further include a first latch bias member 218a to urge, force or bias the first latch 206a towards the first locked position. The first latch bias member 218a may be similar in structure or function to the bias member 204, in further examples. As such, the first latch bias member 218a may be a spring or, further, a compression spring. In other implementations, the first latch bias member 218a may be another type of spring or bias member suitable to urge the first latch 206a towards the first locked position.

The second latch 206b may be similar in structure and/or function to first latch 206a, in some implementations. The second latch 206b may be biased towards a second locked position, shown in FIG. 2B, and movable between the second locked position and a second released position. The example device foot 200 may include a second latch bias member 218b to urge, force or bias the second latch 206b towards the second locked position. The second latch bias member 218b may be similar in function and/or structure to the first latch bias member 218a, in some implementations. In other implementations, the second latch bias member 218b may be another type of bias member or spring.

The second latch 206b may engage with the retention pocket 220 of the support 202 when disposed in the second locked position. In such a situation, the retention pocket 220 may be a feature suitable and capable of receiving both the first and second latches 206a and 206b, when the latches are disposed in the respective first and second locked positions. The retention pocket 220 may be a cutout, ring, or slot that extends circumferentially, either partially or wholly, around the support 202 in such an implementation so as to receive both of the first latch 206a and the second latch 206b. The second latch 206b, in other implementations, may engage with a different feature, slot, pocket, or other geometry when disposed in the second locked position in order to lock or retain the support 202 in the first position. It should be noted that the support 202 may be locked or retained in the first position if the first latch 206a is disposed in the first locked position, or the second latch 206b is disposed in the second locked position. In other words, one of the first and second latches 206a, 206b may be disposed in the released position, yet the support 202 may still be retained in the first position if the other latch is disposed in the corresponding locked position.

In some implementations, the second latch 206b may be diametrically opposed to the first latch 206a. In such a situation, the first latch 206a and the second latch 206b may engage with and retain the support 202 in the first position from opposing, or substantially opposite, sides of the support 202. Thus, the first and second latches 206a, 206b, may be disposed closer to one another when in the respective first and second locked positions than when they are disposed in the respective first and second released positions. In other implementations, the first and second latches 206a, 206b may be positioned relative to one another in another manner, such as side-by-side, or partially opposed to one another.

The example device foot 200 may include a magnetic element 208a. In some examples, particularly in examples wherein the device foot 200 has more than one latch, the magnetic element 208a may be referred to as a first magnetic element 208a. The first magnetic element 208a may comprise a ferrous material, in some implementations, or, in other words, may include iron. In other implementations, the first magnetic element 208a may include a material or component to give the first magnetic element 208a magnetic properties, or otherwise make the first magnetic element 208a carry and be responsive or sensitive to a magnetic field. In further implementations, the first magnetic element 208a may be an electromagnet. The first magnetic element 208a may be responsive or sensitive to a magnetic field such that, when in the vicinity of such a magnetic field, the magnetic flux or magnetic force of the magnetic field may be able to urge, force, bias, or otherwise move the first magnetic element 208a. In some implementations, the first magnetic element 208a may be fixed to the first latch 206a such that, if the first magnetic element 208a is urged or moved, the first latch 206a is also urged or moved in a corresponding manner.

In some implementations, particularly in implementations wherein the example device foot 200 has a second latch 206b, the device foot 200 may further include a second magnetic element 208b fixed to the second latch 206b. The second magnetic element 208b may be similar in structure and/or function to the first magnetic element 208a, in some implementations. Specifically, the second magnetic element 208b may be capable of urging or moving the second latch 206b when the second magnetic element 208b is in the vicinity of a magnetic field. It should be noted that, although the example device foot 200 is described and shown as having two latches and corresponding magnetic elements, it is contemplated that other example device feet may include a differing number of latches and magnetic elements, wherein each latch has a corresponding magnetic element fixed to it.

Figure 2C:
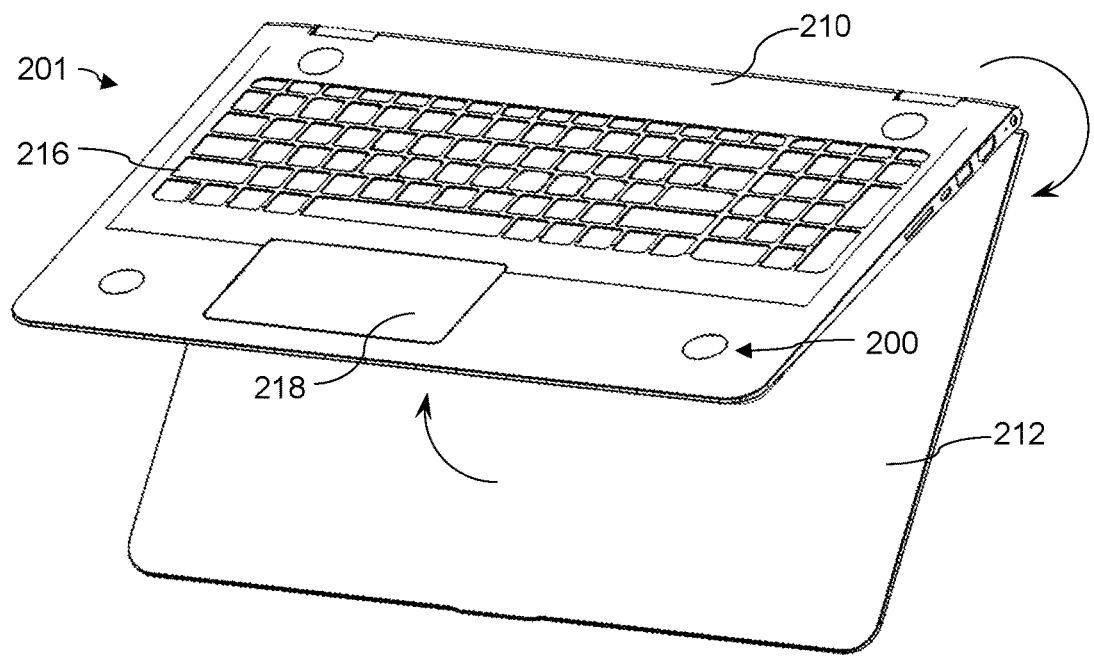
FIG. 2C is a perspective view of an example electronic device having an example device foot.

Referring now to FIG. 2C, a perspective view of the example electronic device 201 is illustrated wherein the electronic device 201 is being transitioned from a first orientation or configuration, illustrated in FIG. 2A, to a second orientation or configuration. In some implementations, the first orientation may be an open clamshell orientation, wherein the electronic device 201 is used similar to a traditional notebook computer, and the second orientation may be a folded orientation, wherein the electronic device 201 is used like a tablet computer. When the electronic device 201 is disposed in the clamshell orientation, the display housing 212 may be disposed in an open position, and when the electronic device 201 is disposed in the folded orientation, the display housing 212 may be disposed in a corresponding folded position. In other words, the display housing 212 may be hingeably engaged with the base housing 210 such that the display housing 212 is movable between the open position, similar to that shown in FIG. 2A, and the folded position.

Figure 2D:
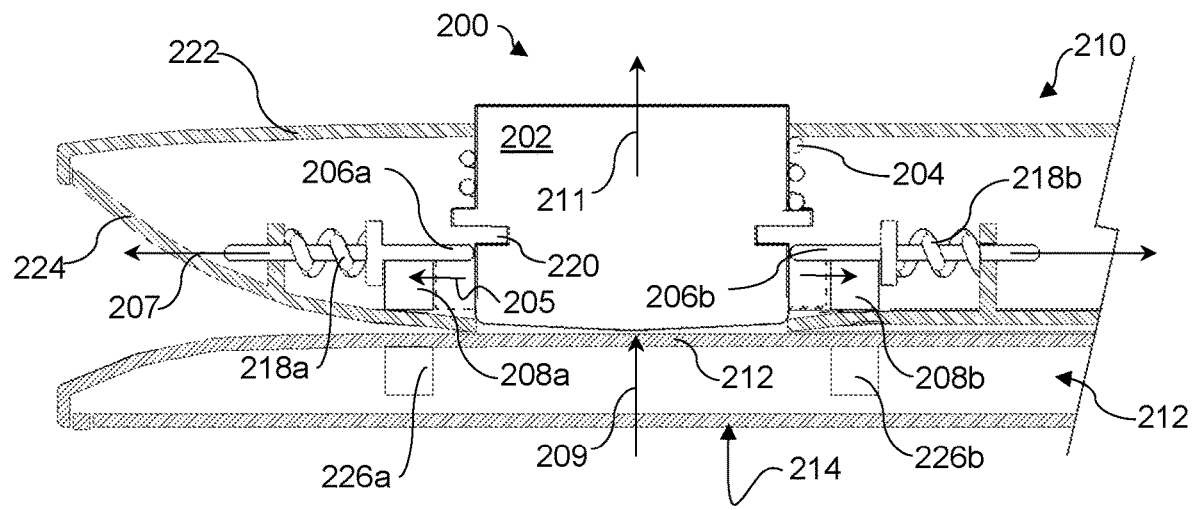
FIG. 2D is a cross-sectional view of an example electronic device having an example device foot.

Referring additionally to FIG. 2D, a cross-sectional view of the example device foot 200 is illustrated wherein the electronic device 201 has been completely transitioned from the first orientation to the second orientation. As such, the display housing 212 has been fully transitioned from the open position to the folded position. In some implementations, the display housing 212 is completely folded around the back of the electronic device 201 such that the display housing 212 abuts against a rear or bottom side of the electronic device 201, or the first side 224 of the base housing 210 thereof. In some implementations, it is contemplated that there may exist an intermediary component disposed in between the display housing 212 and the first side 224 of the base housing 210.

In some implementations, the display housing 212 may include a magnetic driver 226a. In further implementations, the display housing 212 may include a second magnetic driver 226b, and the magnetic driver 226a may be referred to as a first magnetic driver 226a. The second magnetic driver 226b may be similar in structure and/or function to the first magnetic driver 226a, in some implementations. The first magnetic driver 226a may be a magnetic component, or, in other words, a component that may comprise a ferrous material, or another material or component carrying and responsive or sensitive to a magnetic field. In some implementations, the first magnetic driver 226a may be a similar component, or have similar characteristics and/or structure to the first magnetic element 208a.

The first and second magnetic drivers 226a, 226b may be disposed on or within the display housing 212 such that, when the display housing 212 is disposed in the folded position, the first and second magnetic drivers 226a, 226b are disposed near the first and second magnetic elements 208a, 208b of the device foot 200. Regarding just the first magnetic driver 226a for clarity and brevity, upon the first magnetic driver 226a coming into sufficiently close proximity to the first magnetic element 208a, the magnetic field carried or exerted by the first magnetic driver 226a may interact with the magnetic field carried or exerted by the first magnetic element 208a such that the first magnetic element 208a is moved in a direction away from the support 202. Such a direction may be represented by arrow 205 of FIG. 2D. The previous position of the first magnetic element 208a is shown in phantom adjacent to the first magnetic element 208a to further illustrate such movement. In order to effect such movement of the first magnetic element 208a, the first magnetic driver 226a may be disposed in a position further away from the support 202 than the first magnetic element 208a and oriented such that there exists an attractive magnetic force between the first magnetic driver 226a and the first magnetic element 208a, effectively pulling the first magnetic element 208a away from the support 202 and towards the first magnetic driver 226a. In further implementations, the first magnetic driver 226a may be disposed in a position closer to the support 202 than the first magnetic element 208a and oriented such that there exists a repellant magnetic force between the first magnetic driver 226a and the first magnetic element 208a, effectively pushing the first magnetic element 208a away from both the first magnetic driver 226a and the support 202.

As describe above, the first magnetic element 208a may be fixed to the first latch 206a such that movement of the first magnetic element 208a is transferred into corresponding movement of the first latch 206a. As such, upon the first magnetic driver 226a moving the first magnetic element 208a away from support 202, the first latch 206a may slide, translate, or otherwise move in a similar manner from the first locked position to the first released position, as illustrated in FIG. 2D. In other words, the first magnetic element 208a may move the first latch 206a from the locked position to the released position if the first magnetic element 208a is urged towards the released position by a magnetic force. Stated yet differently, the first magnetic driver 226a may exert a magnetic force on the first magnetic element 208a fixed to the first latch 206a such that the first latch 206a may move from the first locked position to the first released position. Such movement may be represented by example direction 207 of FIG. 2D. Upon being transitioned from the first locked position to the first released position, the first latch 206a may disengage from the support 202, and/or the retention pocket 220 thereof, such that the first latch 206a releases, unlocks, or otherwise stops retaining the support 202 in the first position. Such movement of the first latch 206a from the first locked position to the first released position may be against the urging of or against a reactive force of the first latch bias member 218a.

It should be noted that the first magnetic driver 226a may cause the movement of the first magnetic element 208a prior to the display housing 212 fully reaching the folded position. Thus, upon the display housing 212 fully reaching the folded position, the first latch 206a may have already moved away from the support 202, thereby unlocking the support 202. In summary and stated in other words, upon the display housing 212 approaching the folded position, but in some implementations prior to fully reaching the folded position, the first magnetic driver 226a may cause the first magnetic element 208a to move through magnetic force, thereby also moving the first latch 206a and unlocking the support 202. Note, although the preceding description referred to the first magnetic driver 226a, the first magnetic element 208a, and the first latch 206a, it should be understood that the second magnetic driver 226b may effect similar action by the second magnetic element 208b and the second latch 206b. Further, in example device feet having additional latches and magnetic elements, the display housing 212 may include additional corresponding magnetic drivers to induce similar behavior of the additional magnetic elements and latches. Therefore, upon the display housing 212 approaching the folded position, magnetic drivers within the display housing 212 may magnetically urge corresponding magnetic elements and the latches thereto fixed to move to released positions and unlock the support 202, enabling the support 202 to move.

In some implementations, upon the display housing 212 fully reaching the folded position, the display housing 212 or a portion thereof or thereto fixed may contact the support 202, or a portion thereof, which may be protruding from the first side 224, as described above. Upon contacting the support 202, the display housing 212 may push on the support 202 in a direction towards the second position of the support 202. In other words, the display housing 212 may push the support 202 from the first position to the second position upon being disposed in the folded position and the first latch 206a moving from the first locked position to the first released position. Such a pushing direction may be represented by example arrow 209 of FIG. 2D. The support 202 may have been previously unlocked by the first latch 206a and/or the second latch 206b or additional latches in other implementations, and may be movable from the first position to the second position as the support 202 is pushed on by the display housing 212. Stated differently, the support 202 may be movable from the first position to the second position if the first latch 206a is disposed in the first released position, and the second latch 206b is disposed in the second released position. Therefore, the display housing 212 may push the support 202 from the first position to the second position, along example direction 211, as illustrated in FIG. 2D. In some implementations, the support 202 may move in a direction that is transverse to the direction in which the first latch 206a is to move. The movement of the support along direction 211 to the second position may be against the urging of or against a reactive force of the bias member 204.

When disposed in the second position, the support 202 may protrude from the second side 222, which, in some implementations, may be a top surface of the device housing 228, or the base housing 210 thereof, sometimes referred to as a keyboard deck. Further, when the support 202 is disposed in the second position, the electronic device 201 may be placed, set, or rested on a surface with the second side 222 facing such surface. The protrusion of the support 202 through the second side 222 may define a gap in between the second side and the surface upon which the electronic device 201 is disposed. Such a gap may prevent the second side 222 from being scratched, marred, or scraped by the surface. Additionally, when the support 202 is disposed in the second position and protruding from the second side 222, the support, in some implementations, may be flush, below flush, or otherwise not protrude from the first side 224. Therefore, the display housing 212 may be able to abut directly against the first side 224 of the base housing 210 when disposed in the folded position. Therefore, upon a user switching the configuration or orientation of the electronic device 201 from a first orientation (e.g., a clam-shell configuration) to a second orientation (e.g., a tablet configuration), or, in other words, upon a user moving the display housing 212 from the open position to the folded position, the device foot 200 may automatically transition from supporting and/or protecting the bottom surface of the electronic device 201 to supporting and/or protecting the top surface of the electronic device 201.

If the electronic device 201 is disposed in the second orientation, the display housing 212 may be able to be transitioned from the folded position back to the open position. Upon the display housing 212 moving away from the first side 224 of the base housing 210, the bias member 204 may be able to exert a reactive force to push the support 202 back from the second position to the first position. Stated differently, the bias member 204 may move the support 202 from the second position to the first position upon the display housing 212 moving from the folded position to the open position. Additionally, as the display housing 212 moves away from the base housing 210, and therefore the first magnetic element 208a therein, the first magnetic driver 226a will no longer be able to pull or push upon the first magnetic element 208a with magnetic force. As such, the first latch 206a may be able to move from the first released position to the first locked position. Once the support 202 reaches the first position and protrudes from the first side 224 of the base housing 210, the first latch bias member 218a may exert a reactive force upon the first latch 206a so as to push the first latch 206a from the first released position to the first locked position, thereby locking or retaining the support 202 in the first position. In other words, the first latch 206a may move from the first released position to the first locked position upon the support 202 being disposed in the first position. Although the previous description concerned the first magnetic driver 226a, the first magnetic element 208a, and the first latch 206a, it should be noted that a similar action may occur between the second magnetic driver 226b, the second magnetic element 208a, and the second latch 206b. Therefore, stated yet differently, as the display housing 212 is moved from the folded position, the magnetic force exerted on the magnetic elements may cease to be strong enough to hold the magnetic elements, and therefore the respective latches thereto fixed, in the respective released positions. Further, the bias member 204 may push the support 202 from the second position to the first position, and the latch bias members may push the respective latches to the locked positions, thereby locking the support in the first position, as described above.

What is claimed is:

1. A device foot, comprising:
   a support movable between a first position at which the support is to protrude from a bottom surface of a device housing and a second position at which the support is to protrude from a top surface of the device housing;
   a bias member to urge the support towards the first position;
   a latch biased towards a locked position and movable between the locked position and a released position,
   wherein the latch is to lock the support in the first position if disposed in the locked position and to release the support if disposed in the released position such that the support is movable from the first position to the second position; and
   a magnetic element fixed to the latch.

2. The device foot of claim 1, wherein the magnetic element is to move the latch from the locked position to the released position if the magnetic element is urged towards the released position by a magnetic force.

3. The device foot of claim 2, wherein the support is to move in a direction that is transverse to a direction in which the latch is to move.

4. The device foot of claim 2, further comprising a second latch biased towards a second locked position and movable between the second locked position and a second released position,
   wherein the support is movable from the first position to the second position if the latch is disposed in the released position, and the second latch is disposed in the second released position.

5. The device foot of claim 2, wherein latch is to engage with a retention pocket on the support when disposed in the locked position.

6. An electronic device, comprising:
   a device housing, and
   a device foot disposed within the device housing, the device foot comprising:
      a support movable between a first position and a second position, wherein the support is to protrude from a bottom surface of the device housing when disposed in the first position, and is to protrude from a top surface of the device housing when disposed in the second position;
      a bias member to urge the support towards the first position;
      a first latch biased towards a first locked position and movable between the first locked position and a first released position;
      a second latch biased towards a second locked position and movable between the second locked position and a second released position;
      a first magnetic element fixed to the first latch; and
      a second magnetic element fixed to the second latch.

7. The electronic device of claim 6, wherein the support is movable from the first position to the second position if the first latch and the second latch are disposed in the first released position and the second released position, respectively.

8. The electronic device of claim 7, wherein the support is to be retained in the first position if the first latch is disposed in the first locked position, or the second latch is disposed in the second locked position.

9. A computing device, comprising:
   a base housing;
   a device foot disposed within the base housing, the device foot comprising:
      a support movable between a first position, wherein the support protrudes from a first side of the base housing, and a second position, wherein the support protrudes from a second side of the base housing;
      a bias member to urge the support towards the first position;
      a latch biased towards a locked position and movable between the locked position and a released position, the latch to lock the support in the first position when disposed in the locked position and to release the support when disposed in the released position such that the support is movable from the first position to the second position; and
      a magnetic element fixed to the latch; and
   a display housing hingeably engaged with the base housing and movable between an open position and a folded position, the display housing comprising a magnetic driver.

10. The computing device of claim 9, wherein the magnetic driver is to exert a magnetic force on the magnetic element fixed to the latch such that the latch is to move from the locked position to the released position.

11. The computing device of claim 10, wherein the display housing is to push the support from the first position to the second position upon being disposed in the folded position and the latch moving from the locked position to the released position.

12. The computing device of claim 11, wherein the bias member is to move the support from the second position to the first position upon the display housing moving from the folded position to the open position.

13. The computing device of claim 12, wherein the latch is to move from the released position to the locked position upon the support being disposed in the first position.

14. The computing device of claim 13, wherein the base housing includes a keyboard and the display housing includes a touch-screen display.

* * * * *